(12) United States Patent
Shiflett et al.

(10) Patent No.: US 11,926,532 B2
(45) Date of Patent: Mar. 12, 2024

(54) PROCESSES FOR THE PRODUCTION OF METAL OXIDES

(71) Applicant: University of Kansas, Lawrence, KS (US)

(72) Inventors: Mark Brandon Shiflett, Lawrence, KS (US); David Richard Corbin, West Chester, PA (US); Andrew M. Danby, Bishop Wilton (GB); Bala Subramaniam, Lawrence, KS (US)

(73) Assignee: University of Kansas, Lawrence, KS (US)

(*) Notice: Subject to any disclaimer, the term of this patent is extended or adjusted under 35 U.S.C. 154(b) by 6 days.

(21) Appl. No.: 17/572,920

(22) Filed: Jan. 11, 2022

(65) Prior Publication Data

US 2022/0220002 A1 Jul. 14, 2022

Related U.S. Application Data

(60) Provisional application No. 63/135,895, filed on Jan. 11, 2021.

(51) Int. Cl.
*C01G 23/053* (2006.01)

(52) U.S. Cl.
CPC .................................. *C01G 23/053* (2013.01)

(58) Field of Classification Search
CPC ..................................................... C01G 23/07
See application file for complete search history.

(56) References Cited

U.S. PATENT DOCUMENTS

| | | | |
|---|---|---|---|
| 2,957,753 A | 10/1960 | Nelson et al. | |
| 3,352,639 A | 11/1967 | Wikswo | |
| 3,414,379 A | 12/1968 | Wigginton et al. | |
| 3,443,897 A | 5/1969 | Wilson et al. | |
| 3,560,152 A | 2/1971 | Dunham, Jr. et al. | |
| 8,137,647 B2 | 3/2012 | Corbin et al. | |
| 8,801,939 B2 | 8/2014 | Subramaniam et al. | |
| 10,730,814 B2 | 8/2020 | Subramaniam et al. | |
| 2008/0107804 A1* | 5/2008 | Kondo | C23C 18/1279 427/123 |
| 2010/0034714 A1* | 2/2010 | Corbin | C01G 23/04 423/81 |
| 2016/0236174 A1 | 8/2016 | Lowry et al. | |
| 2017/0240434 A1* | 8/2017 | Blanco | C22B 1/11 |
| 2019/0076821 A1 | 3/2019 | Lowry et al. | |

FOREIGN PATENT DOCUMENTS

| | | |
|---|---|---|
| DE | 15 92 445 B2 | 12/1970 |
| FR | 1.248.143 | 12/1959 |
| FR | 1.434.454 | 3/1965 |
| GB | 535214 | 8/1939 |
| GB | 916250 | 11/1959 |

OTHER PUBLICATIONS

Pedraza et al. Journal of Physics and Chemistry of Solids 60 (1999) 445-448 (Year: 1999).*
Voormeij et al. Geoscience Canada, 2003, 31, 1, 11-22 (Year: 2003).*
"Modelling the Chloride Process for Titanium Dioxide Synthesis," A dissertation submitted by Richard Henry West for the degree of Doctor of Philosophy at University of Cambridge (2008); pp. 1-204.
Lauri Aarik et al., "Atomic layer deposition of TiO2 from TiCl4 and O3," Thin Solid Films (2013), vol. 542, pp. 100-107.
W.K. Tolley et al., "Supercritical CO2 Solubility of TiCl4," RI 9216, Report of Investigations/1989, Bureau of Mines, United States Department of the Interior; U.S. Government Printing Office: 611-012/00,038; pp. 1-16.

* cited by examiner

*Primary Examiner* — Anthony J Zimmer
*Assistant Examiner* — Jordan W Taylor
(74) *Attorney, Agent, or Firm* — Bell & Manning, LLC

(57) ABSTRACT

Provided are processes for producing metal oxides, including pigmentary $TiO_2$. In embodiments, a process for producing a metal oxide comprises combining a metal halide and an oxidant in a liquid phase medium under conditions to oxidize the metal halide in the liquid phase medium to produce a metal oxide therefrom.

11 Claims, No Drawings

1

PROCESSES FOR THE PRODUCTION OF METAL OXIDES

CROSS-REFERENCE TO RELATED APPLICATIONS

The present application claims priority to U.S. Provisional Patent Application No. 63/135,895 that was filed Jan. 11, 2021, the entire disclosure of which is hereby incorporated by reference.

BACKGROUND

Titanium (IV) oxide, more commonly known as titanium dioxide ($TiO_2$), is mainly sourced from the naturally occurring titanium iron oxide (iron titanate) ore, ilmenite ($FeTiO_3$). Titanium dioxide is considered the premium white pigment and is used in paints, plastics, paper, and specialty applications. The current state-of-the-art process is a carbochlorination process (2 $FeTiO_3$+7 $Cl_2$+3 C→2$TiCl_4$+2 $FeCl_3$+3 $CO_2$) which produces $TiCl_4$ and $FeCl_3$ at 1500 K followed by oxidation of $TiCl_4$ in oxygen at temperatures ranging from 1500 to 2000 K. In 2020, the global production of $TiO_2$ from the chloride process was over 4 million metric tons (MTs)/year. In 2020, the average price of $TiO_2$ was $3,250/MT and is only expected to increase. The global $TiO_2$ market is expected to exceed $67 Billion by 2025 at a 9% CAGR from 2017 fueled by growing consumption of white pigments in paints and plastics. In order to meet this demand, an additional 100,000 MTs of capacity will be needed annually. This translates to building a new production line every year.

SUMMARY

Provided are processes for producing metal oxides, including pigmentary $TiO_2$. The processes involve the use of a metal halide (e.g., $TiCl_4$), an oxidant (e.g., ozone), and mild conditions (e.g., near room temperature). In embodiments, the processes further involve the use of liquid $CO_2$ as an inert solvent. As demonstrated in the Examples, it has been found that liquid $TiCl_4$ can be completely oxidized in liquid $CO_2$ using ozone ($TiCl_4$+⅔ $O_3$→$TiO_2$+2 $Cl_2$) at temperatures ranging from 273 K to 303 K to produce $TiO_2$ particles. Prior to the present disclosure, it was not known whether the inorganic compound $TiCl_4$ would have solubility in liquid $CO_2$ as well as compatibility with components used in reactors for carrying out the present processes. However, conditions were found in which the $TiCl_4$ and $O_3$ have substantially miscibility in liquid $CO_2$. The by-product chlorine is only partially miscible in the liquid $CO_2$ and therefore, can be separated from the liquid phase. Experiments in a batch reactor show that $TiCl_4$ dissolved in liquid $CO_2$ undergoes reaction with $O_3$ at 293 K to produce amorphous and crystalline $TiO_2$ (rutile and anatase) and $TiOCl_2$ particles. Direct reactions between $O_3$ and $TiCl_4$ may also occur. The present processes dramatically decrease the energy required for the $TiO_2$ oxidation step by 60-80%, lowering the cost of production by 15-25%, and reducing global $CO_2$ emissions from $TiO_2$ plants by 25-30% (2 million MT/y). The results also show that this unique ozonation process for producing $TiO_2$ may also be applied to the production of other metal oxides from metal halides, including those which have applications in catalysis, optoelectronics, and photovoltaics.

In embodiments, a process for producing a metal oxide comprises combining a metal halide and an oxidant in a liquid phase medium under conditions to oxidize the metal halide in the liquid phase medium to produce a metal oxide therefrom.

Other principal features and advantages of the disclosure will become apparent to those skilled in the art upon review of the following drawings, the detailed description, and the appended claims.

DETAILED DESCRIPTION

The present processes involve the oxidative conversion of metal halides to metal oxides in the liquid phase. This is by direct contrast to existing gas phase methods in which the chemical reactions occur in the gas phase. This is also by contrast to methods in which the chemical reactions occur at a gas-solid interface such as in atomic layer deposition. In embodiments, a process of producing a metal oxide according to the present disclosure comprises combining a metal halide and an oxidant in a liquid phase medium. In embodiments, the liquid phase medium is provided by the metal halide in its liquid form. In embodiments, the liquid phase medium comprises $CO_2$. Conditions are used during the process to induce oxidation of the metal halide to produce the metal oxide.

A variety of metal halides may be used. Generally, however, the metal halide is a liquid and/or is one that is miscible in the liquid phase medium under the conditions being used to induce oxidation. The metal halide may be formed from a single metal or more than one metal (i.e., mixed metal halides are encompassed). The metal of the metal halide may be selected from transition metals, metalloids, etc. Specific metals include Ti, Zr, Sn, Nb, Ta, W, Hf, Ge, V, In, Sb, Mo, Re, Ru, Ni, Fe, Cr, Mn, Al, and combinations thereof. For purposes of the present disclosure, each of these specific metals is considered to be a transition metal or a metalloid. The halide of the metal halide is derived from a halogen, e.g., F, Cl, Br, I. Combinations of different types of metal halides may be used.

A variety of oxidants may be used. Oxidants such as ozone ($O_3$) and nitrous oxide ($N_2O$) may be used. Combinations of different types of oxidants may be used. The oxidant may be in its liquid or gaseous state under the conditions being used to induce oxidation. The oxidant may be provided as a mixture, e.g., $O_3$ in $O_2$ or $O_3$ in air. In embodiments, the oxidant is not pure $O_2$. In embodiments, if $O_2$ is used, it is combined with another oxidant, e.g., $O_3$, $N_2O$.

As noted above, the oxidation conversion of the metal halide to the metal oxide is carried out in the liquid phase. In embodiments, this liquid phase is provided by the liquid phase medium comprising $CO_2$, which acts as an inert solvent for the metal halide reactant and the oxidant as well as a heat sink for the reaction. As further described below, liquid $CO_2$ itself is a suitable liquid phase medium, i.e., the liquid phase medium may be pure liquid $CO_2$. However, other additives may be included in the liquid phase medium. Illustrative additives include a variety of directing agents selected to promote the formation of certain crystalline phases, particle sizes, and/or particle shapes for the metal oxide. Suitable directing agents include, e.g., $ZnCl_2$, ZnO, $MgCl_2$, NaCl, and combinations thereof.

In other embodiments, the liquid phase medium may be provided by the metal halide in its liquid form and $CO_2$ is not necessary. In such embodiments, however, other additives such as directing agents may be included in the liquid phase medium as described above.

Thus, in embodiments, the liquid phase medium consists of the metal halide, and optionally, one or both of $CO_2$ and a directing agent. These embodiments encompass the selected oxidant(s) being dissolved within the liquid phase medium.

Conditions for inducing oxidation of the metal halide reactant in the liquid phase medium include parameters such as the temperature, the pressure, and the relative amounts of the metal halide, the oxidant, and, if present, $CO_2$. If $CO_2$ is used, the temperature and pressure may be selected to liquefy $CO_2$. They may also be selected to adjust the concentration of the oxidant and the metal halide in the liquid phase medium (e.g., ozone solubilities in liquid $CO_2$ can be tuned by the appropriate selection of temperature and pressure). Illustrative temperatures of the liquid phase medium include those in the range of from 0° C. to 30° C., from 10° C. to 30° C., from 20° C. to 30° C., and from 20° C. to 25° C. The temperature may be no greater than the critical temperature of $CO_2$ (about 31.1° C.). This further includes embodiments in which the temperature is no greater than 25° C. These temperatures are orders of magnitude lower than those used in existing carbochlorination processes.

The pressure refers to the total pressure of the vapor phase/dense phase present over the liquid phase medium. Illustrative pressures include those in the range from greater than 1 bar to 100 bar. This includes embodiments in which the pressure is in the range from greater than 1 bar to 95 bar, from greater than 1 bar to 90 bar, from greater than 1 bar to 85 bar, from greater than 1 bar to 80 bar, or from 5 bar to 75 bar. This further includes embodiments in which the pressure is no greater than the critical pressure of $CO_2$ (about 73.9 bar).

In embodiments, supercritical $CO_2$ is used, in which the temperature and pressure are greater than the critical temperature and critical pressure of $CO_2$.

In embodiments in which $CO_2$ is not used, the temperature and pressure may be within any of the values described above.

The relative amounts of the metal halide, oxidant, and, if present, $CO_2$ may refer to the amounts added to a reaction cell for containing the liquid phase medium. The term "added" may refer to a one-time addition as in a batch reactor system or a continuous addition per unit time as in a continuous flow reactor system. The metal halide and the oxidant may be added in equivalent molar amounts or an excess of oxidant may be used. For example, the molar ratio (by volume) of (metal halide):(oxidant) may be in a range of from 1:0.667. In embodiments in which $CO_2$ is present, the molar ratio of the (combined metal halide/oxidant):$CO_2$ may be in a range of from 1:0.1 to 1:2. If directing agents are used, these may be included in any amount to achieve the desired effect (e.g., desired crystalline phase, particle size, particle shape).

As noted above, the present processes may be carried out in a variety of reactor systems, including batch reactor systems and continuous flow reactor systems.

As noted above, the oxidation reactions of the present processes convert the metal halide reactant to its metal oxide. The metal oxide produced is desirably fully oxidized, but at least in embodiments, partial oxidation products may also be produced. For example, the present processes convert $TiCl_4$ to $TiO_2$, but some $TiOCl_2$ and $TiOHCl$ hydrates may be also be produced. However, the conditions described above may be adjusted to achieve a desired product selectivity/yield, including maximizing the selectivity/yield of the fully oxidized metal oxide product. In embodiments, the yield of the fully oxidized metal oxide product, e.g., $TiO_2$, is at least 90 weight %, at least 95 weight %, at least 98 weight %, or at least 99 weight %.

The metal oxide product(s) produced by the present processes is generally particulate in form. By "particulate" it is meant that the metal oxide product is in the form of distinct, distinguishable particles, by contrast to a film, layer, or coating of the metal oxide. The particulate morphology may be confirmed using standard imaging techniques, e.g., transmission electron microscopy.

The particles of the metal oxide product may be characterized by their shape and size. The particles may be geometric in shape, but this does not necessarily mean perfectly geometric. Depending upon the use of a particular directing agent, other shapes may be produced. The particles are generally small, having at least one dimension (i.e., 1, 2, or 3) of less than 1000 nm, less than 750 nm, less than 500 nm, less than 300 nm, in a range of from 50 nm to 500 nm or from 100 nm to 300 nm. The term "pigmentary" may be used to describe metal oxide particles having each of their dimensions less than 500 nm, including from 100 nm to 300 nm. The size may be an average size, i.e., an average value as determined from a sample of a plurality of particles. Control of the sizes and distribution of sizes may be facilitated by using a directing agent as described above.

The particles of the metal oxide product may also be characterized by their crystalline phase, control over which may be facilitated by using a directing agent as described above. By way of example, the present processes may be used to convert $TiCl_4$ to anatase $TiO_2$, rutile $TiO_2$, or both.

The present process may include a variety of other steps, e.g., collecting the metal oxide, separating by-product(s), etc.

EXAMPLES

Example 1—Miscibility of $TiCl_4$ in Liquid $CO_2$ 1 mL of $TiCl_4$ was added inside a $N_2$ purged dry box using a syringe to a high-pressure view cell with an interior volume of 20 mL. The view cell was sealed and removed from the $N_2$ drybox. The view cell was connected to a syringe pump filled with liquid $CO_2$. 10 mL liquid $CO_2$ was added to the view cell at 20° C. The $TiCl_4$ liquid was completely miscible in the liquid $CO_2$.

Example 2—Reaction of $TiCl_4$ in Liquid $CO_2$ with $O_3$ 1 mL of $TiCl_4$ was added inside a $N_2$ purged dry box using a syringe to a high-pressure view cell with an interior volume of 20 mL. The view cell was sealed and removed from the $N_2$ drybox. The view cell was connected to a syringe pump filled with liquid $CO_2$. 10 mL liquid $CO_2$ was added to the view cell at 20° C. The $TiCl_4$ liquid was completely miscible in the liquid $CO_2$. 1 mL of ozone was added to the view cell. The pressure used was about 57 bar. The liquid $CO_2$ turned the expected purple color upon addition of the ozone. Slowly over about 30 seconds the solution began to become turbid. The turbidity was the initial formation of $TiO_2$. After 30 minutes it was clear that particles of $TiO_2$ were forming on the surfaces (windows and walls) of the view cell. After 60 minutes all the ozone had been consumed (purple color dissipated) and a white powder was observed inside the view cell on the walls and windows. The solution had a slight yellow/green tint indicating evidence of $Cl_2$ or Cl containing materials. The $CO_2$ was slowly vented from the view cell and the view cell was purged with $N_2$ to prevent any air/water vapor from entering the view cell. The view cell was disassembled and a white powder had formed on the walls and windows of the view cell. X-ray diffraction (XRD) analysis of the powder found $TiO_2$ (anatase and rutile) with minor amounts of $TiOCl_2$ and TiOHCl hydrates. The $TiOCl_2$ and TiOHCl hydrates were the result of excess $TiCl_4$ remaining in the view cell upon exposure to air containing water vapor while evaporating the $CO_2$ (e.g., $TiCl_4+H_2O \rightarrow TiOCl_2+2HCl$).

Example 3—Reaction of $TiCl_4$ in Liquid $CO_2$ with Excess $O_3$

The view cell was thoroughly cleaned with acetone to remove any water contamination on the surfaces and allowed to dry inside a $N_2$ purged dry box. 0.25 mL of $TiCl_4$ was added inside a $N_2$ purged dry box using a syringe to a high-pressure view cell with an interior volume of 20 mL. The view cell was sealed and removed from the $N_2$ drybox. The view cell was connected to a syringe pump filled with liquid $CO_2$. 10 mL liquid $CO_2$ was added to the view cell at 20° C. The $TiCl_4$ liquid was completely miscible in the liquid $CO_2$. 1 mL of ozone was added to the view cell. The pressure used was about 57 bar. The liquid $CO_2$ turned the expected purple color upon addition of the ozone. Slowly over about 30 seconds the solution began to become turbid. The turbidity was the initial formation of $TiO_2$. After 30 minutes it was clear that particles of $TiO_2$ were forming on the surfaces (windows and walls) of the view cell. After 60 minutes all the ozone had been consumed (purple color dissipated) and a white powder was observed inside the view cell on the walls and windows. The solution had a slight yellow/green tint indicating evidence of $Cl_2$ or Cl containing materials. The $CO_2$ was slowly vented from the view cell and the view cell was purged with $N_2$ to prevent any air/water vapor from entering the view cell. The view cell was disassembled and a white powder had formed on the walls and windows of the view cell that were below the liquid $CO_2$ level. Some yellow deposits had formed above the liquid $CO_2$ level. X-ray diffraction (XRD) analysis of the white powder found $TiO_2$ (anatase and rutile). The yellow powder was $TiOCl_2$ and TiOHCl hydrates as a result of excess $TiCl_4$ remaining in the view cell upon exposure to air containing water vapor while evaporating the $CO_2$ (e.g., $TiCl_4+H_2O \rightarrow TiOCl_2+2HCl$).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A process for producing a metal oxide, the process comprising combining a metal halide in its liquid phase and an oxidant in liquid $CO_2$ under conditions to oxidize the metal halide in the liquid $CO_2$ to produce a metal oxide therefrom, wherein the metal halide is $TiCl_4$.

2. The process of claim 1, wherein the oxidant is ozone.

3. The process of claim 2, wherein the ozone is combined with oxygen or air.

4. The process of claim 1, wherein the liquid $CO_2$ further comprises a directing agent.

5. The process of claim 1, wherein the metal oxide is a fully oxidized metal oxide.

6. The process of claim 1, wherein the metal oxide is particulate in form.

7. The process of claim 6, wherein the metal oxide is pigmentary metal oxide.

8. The process of claim 1, wherein the metal halide is in its liquid phase at room temperature and atmospheric pressure.

9. The process of claim 1, wherein the conditions comprise a temperature of from 0° C. to 30° C. and a pressure of from 5 bar to 75 bar.

10. The process of claim 9, wherein the oxidant is ozone.

11. The process of claim 10, wherein the temperature is from 20° C. to 25° C. and the pressure is less than 73.9 bar.

* * * * *